United States Patent
Hikmet et al.

(10) Patent No.: US 12,472,681 B2
(45) Date of Patent: Nov. 18, 2025

(54) MECHANICALLY STABLE CORE-SHELL FDM PRINTS CONTAINING POROUS CORE

(71) Applicant: SIGNIFY HOLDING B.V., Eindhoven (NL)

(72) Inventors: Rifat Ata Mustafa Hikmet, Eindhoven (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 155 days.

(21) Appl. No.: 18/019,370

(22) PCT Filed: Jul. 20, 2021

(86) PCT No.: PCT/EP2021/070246
§ 371 (c)(1),
(2) Date: Feb. 2, 2023

(87) PCT Pub. No.: WO2022/028874
PCT Pub. Date: Feb. 10, 2022

(65) Prior Publication Data
US 2023/0302720 A1   Sep. 28, 2023

(30) Foreign Application Priority Data

Aug. 6, 2020 (EP) .................................. 20189731

(51) Int. Cl.
*B29C 64/118* (2017.01)
*B33Y 70/00* (2020.01)
(Continued)

(52) U.S. Cl.
CPC ............ *B29C 64/118* (2017.08); *B33Y 70/00* (2014.12); *B29K 2105/04* (2013.01);
(Continued)

(58) Field of Classification Search
CPC .............. B29C 64/118; B29K 2105/04; B29K 2995/0063; B29K 2995/0094;
(Continued)

(56) References Cited

U.S. PATENT DOCUMENTS 10,254,499 B1   4/2019 Cohen et al.
2012/0231225 A1*  9/2012 Mikulak ................... D01F 8/12
                                              264/255
(Continued)

FOREIGN PATENT DOCUMENTS

KR    20200055830 A    5/2020
WO    2016187097 A1    11/2016
(Continued)

*Primary Examiner* — JaMel M Nelson
*Assistant Examiner* — Erica Hartsell Funk

(57) ABSTRACT

The invention provides a method for producing a 3D item by means of fused deposition modelling, the method comprising: (a) a 3D printing stage comprising: layer-wise depositing 3D printable material, wherein the 3D printable material comprises 3D printable core material and 3D printable shell material, to provide the 3D item comprising a core-shell layer of 3D printed material, wherein the 3D printed material comprises a core comprising 3D printed core material and a shell comprising 3D printed shell material, wherein the shell at least partly encloses the core, wherein the 3D printable core material comprises a pore forming material with a first concentration c1, wherein the 3D printable shell material comprises the pore forming material with a second concentration c2, wherein $c_2/c_1 \leq 0.9$; and (b) a pore forming stage comprising: heating one or more of (i) the printable material and (ii) the 3D printed material.

8 Claims, 5 Drawing Sheets

(51) Int. Cl.
  *B29K 105/04*    (2006.01)
  *B29L 31/00*    (2006.01)
  *B33Y 10/00*    (2015.01)
  *B33Y 80/00*    (2015.01)
(52) U.S. Cl.
  CPC ............... *B29K 2995/0063* (2013.01); *B29K 2995/0094* (2013.01); *B29L 2031/747* (2013.01); *B33Y 10/00* (2014.12); *B33Y 80/00* (2014.12)
(58) Field of Classification Search
  CPC .... B29L 2031/747; D01D 5/38; D01D 5/247; D01D 3/24
  See application file for complete search history.

(56) References Cited

U.S. PATENT DOCUMENTS

| | | | |
|---|---|---|---|
| 2017/0121854 A1* | 5/2017 | van der Gaag | D01F 1/08 |
| 2019/0283326 A1* | 9/2019 | Leibig | B29C 64/393 |
| 2023/0089703 A1* | 3/2023 | Kalish | C08J 9/10 |

FOREIGN PATENT DOCUMENTS

| | | | | |
|---|---|---|---|---|
| WO | 2018106705 A1 | 6/2018 | | |
| WO | WO-2019133651 A1 * | 7/2019 | ........... | B29C 64/118 |
| WO | 2020048889 A1 | 3/2020 | | |

\* cited by examiner

MECHANICALLY STABLE CORE-SHELL FDM PRINTS CONTAINING POROUS CORE

CROSS-REFERENCE TO PRIOR APPLICATIONS

This application is the U.S. National Phase application under 35 U.S.C. § 371 of International Application No. PCT/EP2021/070246, filed on Jul. 20, 2021, which claims the benefit of European Patent application Ser. No. 20/189, 731.1, filed on Aug. 6, 2020. These applications are hereby incorporated by reference herein.

FIELD OF THE INVENTION

The invention relates to a method for manufacturing a 3D (printed) item. Further, the invention may relate to a filament for use in such method. The invention also relates to the 3D (printed) item obtainable with such method. Further, the invention relates to a lighting device including such 3D (printed) item.

BACKGROUND OF THE INVENTION

The introduction of pores in FDM printing is known. For instance, EP3403806, describes cellular thermoplastic structures with hierarchical multi-scale porosity that are produced from an integrated approach of 3D printing, preferably by Fused Deposition Modeling (FDM), and of supercritical gas foaming (SCF). Porous filaments or strands and related hierarchical structures are processed in one continuous step. The influence of printing parameters (e.g. deposition temperature and speed) on foam morphology and pores distribution is described for a thermoplastic based polymer. The process may be applied to other thermoplastic filaments, or strands, with different properties. Such strands are combined in 3D configurations to create hierarchical structures and offer the possibility to fine tune cellular morphology at different scales in a continuous way.

WO-2020/048889 discloses a method for producing a 3D item by means of fused deposition modelling. The method has a 3D printing stage and an exposure stage. During the 3D printing stage, the extrudate comprises a core-shell extrudate having a core of a core material and a shell of a shell material. During the exposure stage, at least part of the surface of the 3D item is exposed to a liquid, wherein the core material has a lower solubility for the liquid than the shell material.

WO-2016/187097 discloses a foam ink composition for printing porous structures comprises stabilizing particles and gas bubbles dispersed in a solvent. The stabilizing particles comprise a predetermined interfacial energy so as to exhibit a contact angle with the solvent of from about 15° to about 90°. At least a portion of the stabilizing particles are positioned at interfacial regions between the solvent and the gas bubbles, thereby stabilizing the gas bubbles in the foam ink composition. A 3D printed hierarchical porous structure comprises one or more continuous filaments arranged in a predetermined pattern on a substrate, the one or more continuous filaments comprising a sintered material and including a porosity of at least about 40 vol. %.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals, and polymers. 3D printing can also be used in producing molds which can then be used for replicating objects.

For the purpose of making molds, the use of polyjet technique has been suggested. This technique makes use of layer by layer deposition of photo-polymerizable material which is cured after each deposition to form a solid structure. While this technique produces smooth surfaces the photo curable materials are not very stable, and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast, low cost and can be used for printing complicated 3D objects. Such printers are used in printing various shapes using various polymers. The technique is also being further developed in the production of LED luminaires and lighting solutions.

Hence, it is an aspect of the invention to provide an alternative 3D printing method and/or 3D (printed) item which preferably further at least partly obviate(s) one or more of above-described drawbacks. The present invention may have as object to overcome or ameliorate at least one of the disadvantages of the prior art, or to provide a useful alternative.

Hence, in a first aspect the invention provides a method for producing a 3D item by means of fused deposition modelling. Especially, the method may comprise a 3D printing stage comprising layer-wise depositing 3D printable material. In embodiments, the 3D printable material may comprise 3D printable core material and 3D printable shell material, to provide the 3D item. The 3D item (thereby) comprises a core-shell layer of 3D printed material. Especially, the 3D printed material comprises a core comprising 3D printed core material and a shell comprising 3D printed shell material, wherein the shell may at least partly enclose the core. In embodiments, the 3D printable core material may comprise a pore forming material with a first concentration $c_1$, and the 3D printable shell material may comprise the pore forming material with a second concentration $c_2$. Especially, $c_2/c_1 \leq 0.9$. Especially, the method may further comprise a pore forming stage comprising heating one or more of (i) the printable material and (ii) the 3D printed material for inducing pore formation. The 3D printing stage and the pore forming stage may overlap in time or even essentially be the same. Hence, in specific embodiments the invention provides a method for producing a 3D item by means of fused deposition modelling, the method comprising: (a) a 3D printing stage comprising: layer-wise depositing 3D printable material, wherein the 3D printable material comprises 3D printable core material and 3D printable shell material, to provide the 3D item comprising a core-shell layer of 3D printed material, wherein the 3D printed material comprises a core comprising 3D printed core material and a shell comprising 3D printed shell material, wherein the shell at least partly encloses the core, wherein the 3D printable core material comprises a pore forming material with a first concentration $c_1$, wherein the 3D printable shell material comprises the pore forming material with a second concentration $c_2$, wherein $c_2/c_1 \leq 0.9$; and (b) a pore forming stage comprising: heating one or more of (i) the printable material and (ii) the 3D printed material.

In this way, it may be possible to prepare porous 3D printed items by means of FDM, whilst reducing the amount of material used, thus reducing the weight of the printed objects whilst maintaining the structural integrity and the smooth surface structure of the printed items. This is achieved by printing a porous core and a non-porous shell.

In embodiments, the shell fully encloses the core (in cross-sectional view), thus providing smooth surfaces on each layer. To further employ the advantages of weight reduction, the amount of shell may be minimized. In specific embodiments, the shell may partly enclose the core. The shell may only enclose the core at areas that will become the exterior of the 3D printed item using this method. Therefore, no shell may be present between cores of adjacent layers.

For facilitating pore formation, the 3D printable material comprises thermoplastic material and a pore forming material embedded therein. The pore forming material may expand during the pore forming stage and therefore produces pores inside the 3D printable or 3D printed material. Especially, in embodiments the pore forming material is heat sensitive. The pores may be formed due to the evaporation and/or expansion of the pore forming material, such as in the case of embedded water being heated over its boiling point.

The porosity may be depending on the type of pore forming material and the concentration of pore forming material. The porosity may be determined via a direct method, such as especially determining the bulk volume of the porous sample, and then determining the volume of the skeletal material with no pores (pore volume=total volume−material volume). Alternatively, the porosity may be determined via an optical method, such as especially determining the area of the material versus the area of the pores visible under the microscope. The "areal" and "volumetric" porosities may be essentially equal for porous media with random structure. Likewise, via an optical method pore sizes may be determined such as especially measuring the size of the pores visible under the microscope. Alternatively, the porosity may be determined using especially mercury pressure porosimetry. Alternatively, especially X-ray tomography may be applied. The pore size of spherical pores may be defined by their diameter. For irregularly shaped pores, an equivalent spherical diameter may be determined. The equivalent spherical diameter (or ESD) of an (irregularly) shaped object is the diameter of a sphere of equivalent volume. The equivalent circular diameter (or ECD) of an (irregularly shaped) two-dimensional shape is the diameter of a circle of equivalent area. For instance, the equivalent circular diameter of a square with side a is $2*a*SQRT(1/\pi)$. For a circle, the diameter is the same as the equivalent circular diameter. Would a circle in an xy-plane with a diameter D be distorted to any other shape (in the xy-plane), without changing the area size, than the equivalent circular diameter of that shape would be D.

In embodiments, the porosity of the printed core material in the core-shell layer may be in the range 5-60 vol. %, especially in the range 5-50 vol. %, more especially in the range 5-40 vol. %, such as less than 40 vol. %, more especially less than 35 vol. %.

The pore forming material may be a single pore forming material, or a plurality of pore forming materials. The ratio of an individual pore forming material in a mixture of pore forming materials may deviate from the overall ratio of pore forming materials between the core and shell. Thus, a specific pore forming material a, with a first concentration in de core $ca_1$ and a second concentration in the shell $ca_2$, might in specific embodiments comply with $ca_2/ca_1 \geq 1$. However, the total concentration of pore forming materials in the core $c_1$ is larger than the total concentration of pore forming materials in the shell $c_2$. Thus $c_2/c_1 \leq 0.9$, especially $c_2/c_1 \leq 0.8$, more especially $c_2/c_1 \leq 0.6$, in embodiments $c_2/c_1 \leq 0.3$, $c_2/c_1 \leq 0.1$, more especially $c_2/c_1 \leq 0.05$. Especially $c_2/c_1 \leq 0.01$, more especially $c_2/c_1 \leq 0.001$.

Hence, in embodiments the 3D printable shell material does essentially not comprise any pore forming material (i.e. its concentration may essentially zero).

In embodiments, the pore forming material in the core printable material and the pore forming material in the shell printable material are one of (i) the same pore forming material or the same pore forming materials at the same ratios, (ii) the same pore forming materials at different ratios, or (iii) different pore forming materials. In specific embodiments, the pore forming material (or pore forming materials) may have a boiling point above room temperature.

In embodiments, the pore forming material may be liquid at room temperature and a gas at the extrusion temperature (i.e. the temperature with which the 3D printable material is extruded from the printer nozzle). Especially, the pore forming material has a boiling point between room temperature and 250° C., more especially, the pore forming material has a boiling point between room temperature and 90-240° C. During the pore forming stage, the pore forming material is heated above its boiling point, which may result in pore formation. Especially, the nozzle temperature is above the boiling point of the pore forming material.

In embodiments, wherein the pore forming material may comprise a plurality of pore forming materials, the pore forming material (i.e. the combination of pore forming materials) may have a boiling range. Especially, the nozzle temperature may then be chosen over a starting point of the boiling range.

Materials that may especially qualify as pore forming materials may be selected from the group consisting of water and hydrocarbons, especially alkanes and alkenes. Suitable alkanes may include one or more of the group of (i) pentanes, (ii) hexanes, (iii) heptanes and (iv) octanes. Suitable alkenes may include one or more of the group of (i) pentenes, (ii) hexenes, (iii) heptenes, (iv) octanes, and (v) nonenes; however, other suitable hydrocarbons may also be applied. Hence, combinations of two or more may also be applied, like pentene and hexene, or like pentene and heptane, etc.

The pore forming material may comprise water. In specific embodiments, $c_2 \leq 0.25$ wt %, especially $c_2 \leq 0.1$ wt %, more especially $c_2 \leq 0.04$ wt %. In embodiments $c_2 \leq 0.03$ wt %, in specific embodiments $c_2 \leq 0.02$ wt %. In embodiments, the pore forming material comprises water and the pore forming stage comprises applying one or more of (i) microwave radiation and (ii) ultrasound to the core-shell 3D printed layer.

The pore forming material may comprise pentene. In specific embodiments, $c_2 \leq 0.15$ wt %, especially $c_2 \leq 0.06$ wt %, more especially $c_2 \leq 0.025$ wt %. In embodiments $c_2 \leq 0.02$ wt %, in specific embodiments $c_2 \leq 0.015$ wt %.

In embodiments c1≥0.01 wt %, even more especially c1≥0.02 wt %, yet even more especially, c1≥0.03 wt %. Yet further, in specific embodiments c1≥0.1 wt %, such as c1≥0.25 wt %, like in embodiments c1≥0.3 wt %. In yet further embodiments c1≤1 wt %.

Hence, in embodiments 0.01 wt %≤c1≤1 wt %, especially 0.05 wt %≤c1≤0.5 wt % and c2≤0.04 wt %, wherein c2/c1<1, especially wherein c2/c1≤0.9.

When two or more different pore forming materials are available in the 3D printable core material, especially the total weight of the pore forming materials may comply with 0.01 wt %≤c1≤1 wt %, especially 0.05 wt %≤c1≤0.5 wt % and c2≤0.04 wt %, wherein c2/c1<1, especially wherein c2/c1≤0.9.

In embodiments, the concentration of pore forming material may be increased by exposing the printable material to high vapor concentrations of the pore forming material. For instance, in embodiments the 3D printable core material may be exposed to humid air, such as air with an RH of at least 75%, like at least 90%.

Especially, the printable material may be chemically functionalized, e.g. with hydrophilic groups, for retaining higher concentrations of pore forming material.

Besides the pore forming material, the 3D printable material may also comprise other additives and/or particles. In embodiments, stabilizers, light absorbers, dye, reflective particles, etc. . . . may be included. This is described in more detail later.

The density reduction that may be obtained, is depending on the selection of several parameters that may include: the pore forming material, the first concentration c1, the second concentration c2, and 3D printing conditions. In embodiments, a density reduction of the core-shell layer of more than 10%, especially more than 20%, more especially more than 30% may be obtained, compared to the theoretical maximum density that is obtained when no pore forming material was incorporated in the 3D printable material.

In embodiments, the method provides a 3D printed item with a core-shell layer with a shell that has a shell width (W2), and a core-shell layer that has a layer width (W); wherein 0.01≤W2/W≤0.3, especially wherein 0.02≤W2/W≤0.3, more especially wherein 0.03≤W2/W≤0.2. A smaller shell width W2 may result in a (relatively) higher density reduction, a larger shell width W2 may lead to better mechanical properties.

In embodiments, the method provides a core-shell filament that has a shell with a shell width (W2F), wherein the core-shell filament has a width (WF); wherein 0.01≤W2F/WF≤0.3, especially wherein 0.02≤W2F/WF≤0.3, more especially wherein 0.03≤W2F/WF≤0.2.

In embodiments, the core-shell layer may be printed with a core-shell nozzle. In embodiments, the core-shell layer may be obtained from a core-shell filament (such as e.g. described above).

The 3D printing stage and the pore forming stage may overlap in time or even essentially be the same. In embodiments, the pore forming material has a boiling temperature, and the method comprises 3D printing the 3D printable material with a nozzle temperature higher than the boiling temperature.

In embodiments, the diameter of the pores d in the core may be in the range of d/W≤0.4, such as in specific embodiments d/H≤0.4. Alternatively or additionally, in embodiments d/W≥0.05, even more especially d/H≥0.05. Here, H refers to the height of the core-shell layer and W refers to the width of the core-shell layer. In general, H≤W (see also below).

In specific embodiments 50 µm≤d≤2 mm, especially 20 µm≤d≤2 mm.

The pores may be voids, which may be embedded in the 3D printed material.

In embodiments, the core and shell are the same thermoplastic material. Especially, the core and shell comprise polycarbonate.

As indicated above, the method comprises depositing during a printing stage 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed. The term "extrudate" may be used to define the 3D printable material downstream of the printer head, but not yet deposited. The latter is indicated as "3D printed material". In fact, the extrudate comprises 3D printable material, as the material is not yet deposited. Upon deposition of the 3D printable material or extrudate, the material is thus indicated as 3D printed material. Essentially, the materials are the same material, as the thermoplastic material upstream of the printer head, downstream of the printer head, and when deposited, is essentially the same material.

Herein, the term "3D printable material" may also be indicated as "printable material. The term "polymeric material" may in embodiments refer to a blend of different polymers but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials. The term "pore forming material" may in embodiments refer to a single type of pore forming material but may also refer to a plurality of different pore forming materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature. In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former. The glass temperature may e.g. be determined with differential scanning calorimetry. The melting point or melting temperature can also be determined with differential scanning calorimetry.

In embodiments, the boiling point of the pore forming material may be lower than the $T_g$ or $T_m$ of the printable material. In specific embodiments, the boiling point of the pore forming material may be lower than the $T_g$ of the printable material.

As indicated above, the invention thus provides a method comprising providing a filament of 3D printable material and printing during a printing stage said 3D printable material on a substrate, to provide said 3D item.

Hence, in another aspect the invention provides a filament for producing a 3D item by means of fused deposition modelling. Especially, the filament may comprise a core comprising a printable core material. The printable core material may comprise a pore forming material at a first concentration c1. The filament may also comprise a shell comprising a printable shell material. The printable shell material may comprise the pore forming material at a second concentration c2. In embodiments $c2/c1 \leq 0.01$, or even lower (see above). In specific embodiments $c2 \leq 0.04$ wt %, or even lower (see above). In embodiments, the shell at least partly encloses the core.

Hence, in specific embodiments the invention provides a filament for producing a 3D item by means of fused deposition modelling, the filament comprising: (i) a core comprising a printable core material, wherein the printable core material comprises a pore forming material at a first concentration c1; and (ii) a shell comprising a printable shell material, wherein the printable shell material comprises the pore forming material at a second concentration c2; wherein $c2/c1 \leq 0.01$, and wherein $c2 \leq 0.04$ wt %; wherein the shell at least partly encloses the core. Especially, in embodiments the shell entirely encloses the core (in cross-sectional view).

In this way, it may be possible to prepare porous 3D printed items by means of FDM, whilst starting from a previously prepared filament.

Especially, in embodiments the printable material may be chemically functionalized, e.g. with hydrophilic groups, for retaining higher concentrations of pore forming material.

In specific embodiments, the filament may comprise (i) a core comprising a printable core material having a porosity p1, and (ii) a shell comprising a printable shell material having a porosity p2, wherein $p2/p1 \leq 0.9$, especially wherein $p2/p1 \leq 0.8$, more especially wherein $p2/p1 \leq 0.6$, in embodiments $p2/p1 \leq 0.3$, $p2/p1 \leq 0.1$, especially $p2/p1 \leq 0.05$, especially $p2/p1 \leq 0.01$, more especially $p2/p1 \leq 0.001$; wherein the shell at least partly encloses the core.

Hence, in embodiments the 3D printed shell material does essentially not have any porosity (i.e. p2 is essentially zero).

In specific embodiments, the filament comprises a shell that has a shell width (W2F), and the core-shell filament has a width (WF); wherein $0.01 \leq W2F/WF \leq 0.3$, especially wherein $0.02 \leq W2F/WF \leq 0.3$, more especially wherein $0.03 \leq W2F/WF \leq 0.2$.

Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polycarbonate (PC), Polystyrene (PS), PE (such as expanded- high impact-Polythene (or polyethene), Low density (LDPE) High density (HDPE)), PVC (polyvinyl chloride) Polychloroethene, such as thermoplastic elastomer based on copolyester elastomers, polyurethane elastomers, polyamide elastomers polyolefine based elastomers, styrene based elastomers, etc. . . . . . Optionally, the 3D printable material comprises a 3D printable material selected from the group consisting of Urea formaldehyde, Polyester resin, Epoxy resin, Melamine formaldehyde, thermoplastic elastomer, etc. . . . . . Optionally, the 3D printable material comprises a 3D printable material selected from the group consisting of a polysulfone. Elastomers, especially thermoplastic elastomers, are especially interesting as they are flexible and may help obtaining relatively more flexible filaments comprising the thermally conductive material. A thermoplastic elastomer may comprise one or more of styrenic block copolymers (TPS (TPE-s)), thermoplastic polyolefin elastomers (TPO (TPE-o)), thermoplastic vulcanizates (TPV (TPE-v or TPV)), thermoplastic polyurethanes (TPU (TPU)), thermoplastic copolyesters (TPC (TPE-E)), and thermoplastic polyamides (TPA (TPE-A)).

Suitable thermoplastic materials, such as also mentioned in WO2017/040893, may include one or more of polyacetals (e.g., polyoxyethylene and polyoxymethylene), poly($C_{1-6}$ alkyl)acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polycarbonates, polyethylene terephthalates, polyethylene naphtholates, polybutylene terephthalates, polyarylates), and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl)methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers. Embodiments of polyamides may include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl)acrylates and poly($C_{1-6}$ alkyl)methacrylates, which include, for instance, polymers of methyl acrylate, ethyl acrylate, acrylamide, methacrylic acid, methyl methacrylate, n-butyl acrylate, and ethyl acrylate, etc. In embodiments, a polyolefine may include one or more of polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene.

In specific embodiments, the 3D printable material (and the 3D printed material) comprise one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and semi-crystalline polytethylene terephthalate (PET), acrylonitrile butadiene styrene (ABS), poly(methyl methacrylate) (PMMA), polystyrene (PS), and styrene acrylic copolymers (SMMA).

The term 3D printable material is further also elucidated below, but especially refers to a thermoplastic material, optionally including additives, to a volume percentage of at maximum about 60%, especially at maximum about 30 vol. %, such as at maximum 20 vol. % (of the additives relative to the total volume of the thermoplastic material and additives).

The printable material may thus in embodiments comprise two phases. The printable material may comprise a phase of printable polymeric material, especially thermoplastic material (see also below), which phase is especially an essentially continuous phase. In this continuous phase of thermoplastic material polymer additives such as one or more of antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent may be present. The additive may have useful properties selected from optical properties, electrical properties, thermal properties, and mechanical properties (see also above).

The printable material in embodiments may comprise particulate material, i.e. particles embedded in the printable polymeric material, which particles form a substantially discontinuous phase. The number of particles in the total mixture is especially not larger than 60 vol. %, relative to the total volume of the printable material (including the (anisotropically conductive) particles) especially in applications for reducing thermal expansion coefficient. For optical and surface related effect number of particles in the total mixture is equal to or less than 20 vol. %, such as up to 10 vol. %, relative to the total volume of the printable material (including the particles). Hence, the 3D printable material especially refers to a continuous phase of essentially thermoplastic material, wherein other materials, such as particles, may be embedded. Likewise, the 3D printed material especially refers to a continuous phase of essentially thermoplastic material, wherein other materials, such as particles, are embedded. The particles may comprise one or more additives as defined above. Hence, in embodiments the 3D printable materials may comprises particulate additives.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. . . . . Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. . . . . Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby.

Layer by layer printable material is deposited, by which the 3D printed item is generated (during the printing stage). The 3D printed item may show a characteristic ribbed structure (originating from the deposited filaments). However, it may also be possible that after a printing stage, a further stage is executed, such as a finalization stage. This stage may include removing the printed item from the receiver item and/or one or more post processing actions. One or more post processing actions may be executed before removing the printed item from the receiver item and/or one or more post processing actions may be executed after removing the printed item from the receiver item. Post processing may include e.g. one or more of polishing, coating, adding a functional component, cross-linking, etc. . . . . Post-processing may include smoothening the ribbed structures, which may lead to an essentially smooth surface. Post-processing may include cross-linking of the thermoplastic material. This may result in fewer or no thermoplastic properties of the material.

Further, the invention relates to a software product that can be used to execute the method described herein. Therefore, in yet a further aspect the invention also provides a computer program product, when running on a computer which is functionally coupled to or comprised by a fused deposition modeling 3D printer, is capable of bringing about the method as described herein.

Hence, in an aspect the invention (thus) provides a software product, which, when running on a computer is capable of bringing about (one or more embodiments of) the method (for producing a 3D item by means of fused deposition modelling) as described herein.

The herein described method provides 3D printed items. Hence, the invention also provides in a further aspect a 3D printed item obtainable with the herein described method. In a further aspect a 3D printed item obtainable with the herein described method is provided.

Especially, the invention provides a 3D item comprising 3D printed material, wherein the 3D item may comprise a plurality of layers of 3D printed material. In embodiments at least one of the layers comprises a core-shell layer of 3D printed material. Especially, wherein the 3D printed material comprises (i) a core comprising a 3D printed core material, and (ii) a shell comprising a 3D printed shell material. In embodiments, the shell may at least partly enclose the core. In embodiments the 3D printed core material has a first porosity p1, and the 3D printed shell material has a second porosity p2; wherein $p2/p1 \leq 0.9$, especially $p2/p1 \leq 0.8$, more especially $p2/p1 \leq 0.6$, in embodiments $p2/p1 \leq 0.3$, $p2/p1 \leq 0.1$, more especially $p2/p1 \leq 0.05$, especially $p2/p1 \leq 0.01$, more especially $p2/p1 \leq 0.001$. Hence, in specific embodiments, the invention provides a 3D item comprising 3D printed material, wherein the 3D item comprises a plurality of layers of 3D printed material, wherein at least one of the layers comprises a core-shell layer of 3D printed material; wherein the 3D printed material comprises (i) a core comprising a 3D printed core material, and (ii) a shell comprising a 3D printed shell material, wherein the shell at least partly encloses the core, wherein the 3D printed core material has a first porosity p1, wherein the 3D printed shell material has a second porosity p2; wherein $p2/p1 \leq 0.9$.

Hence, in embodiments the 3D printed shell material does essentially not have any porosity (i.e. p2 is essentially zero).

The 3D printed item may comprise a plurality of layers on top of each other, i.e. stacked layers. The width (thickness) and height of (individually 3D printed) layers may e.g. in embodiments be selected from the range of 100-5000 µm, such as 200-2500 µm, with the height in general being smaller than the width. For instance, the ratio of height and width may be equal to or smaller than 0.8, such as equal to or smaller than 0.6.

Layers may be core-shell layers or may consist of a single material. Within a layer, there may also be a change in composition, for instance when a core-shell printing process was applied and during the printing process it was changed from printing a first material (and not printing a second material) to printing a second material (and not printing the first material).

At least part of the 3D printed item may include a coating.

Some specific embodiments in relation to the 3D printed item have already been elucidated above when discussing the method. Below, some specific embodiments in relation to the 3D printed item are discussed in more detail.

In embodiments, the 3D item may comprise a first porosity p1 of the core in the range 5-60 vol. %, especially in the range 5-50 vol. %, more especially in the range 5-40 vol. %, such as less than 40 vol. %, more especially less than 35 vol. %.

In embodiments, the 3D item may comprise a density reduction of more than 10%, especially more than 20%, more especially more than 30%, compared to the theoretical maximum density when p1 and p2 are each smaller than 1 vol. %.

In specific embodiments, the cross-sectional area of the 3D printed item comprising at least two, such as at least five, layer axes Ax is larger than or equal to 5 cm$^2$, such as equal to or larger than 25 cm$^2$.

In specific embodiments, the 3D printed item comprises at least 5 layers, like at least 8 layers, such as at least 10 layers that comprise the herein described porous core. In yet other embodiments, layers with this porous core and layers without this porous core may alternate each other. In yet further embodiments, sets of at least two layers with this porous core and sets of at least two layers without this porous core may alternate each other.

The (with the herein described method) obtained 3D printed item may be functional per se. For instance, the 3D printed item may be a lens, a collimator, a reflector, etc. . . . . . The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light transmissive element, an optical filter, etc. . . . . . The term optical component may also refer to a light source (like a LED). The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. . . . . . Alternatively, or additionally, the functional component may comprise a thermal component (e.g. configured to cool or to heat an electrical component). Hence, the functional component may be configured to generate heat or to scavenge heat, etc. . . .

As indicated above, the 3D printed item may be used for different purposes. Amongst others, the 3D printed item may be used in lighting. Hence, in yet a further aspect the invention also provides a lighting device comprising the 3D item as defined herein. In a specific aspect the invention provides a lighting system comprising (a) a light source configured to provide (visible) light source light and (b) the 3D item as defined herein, wherein 3D item may be configured as one or more of (i) at least part of a housing, (ii) at least part of a wall of a lighting chamber, and (iii) a functional component, wherein the functional component may be selected from the group consisting of an optical component, a support, an electrically insulating component, an electrically conductive component, a thermally insulating component, and a thermally conductive component. Hence, in specific embodiments the 3D item may be configured as one or more of (i) at least part of a lighting device housing, (ii) at least part of a wall of a lighting chamber, and (iii) an optical element. As a relative smooth surface may be provided, the 3D printed item may be used as mirror or lens, etc. . . . . In embodiments, the 3D item may be configured as shade. A device or system may comprise a plurality of different 3D printed items, having different functionalities.

Returning to the 3D printing process, a specific 3D printer may be used to provide the 3D printed item described herein. Therefore, in yet a further aspect the invention also provides a fused deposition modeling 3D printer, comprising (a) a printer head comprising a printer nozzle, and (b) a 3D printable material providing device configured to provide 3D printable material to the printer head, wherein the fused deposition modeling 3D printer is configured to provide said 3D printable material as indicated above.

The printer nozzle may include a single opening. In other embodiments, the printer nozzle may be of the core-shell type, having two (or more) openings. The term "printer head" may also refer to a plurality of (different) printer heads; hence, the term "printer nozzle" may also refer to a plurality of (different) printer nozzles.

The 3D printable material providing device may provide a filament comprising 3D printable material to the printer head or may provide the 3D printable material as such, with the printer head creating the filament comprising 3D printable material. Hence, in embodiments the invention provides a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to a substrate, as indicated above Especially, the 3D printer comprises a controller (or is functionally coupled to a controller) that is configured to execute in a controlling mode (or "operation mode") the method as described herein. Instead of the term "controller" also the term "control system" (see e.g. above) may be applied.

The term "controlling", and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling", and similar terms may additionally include monitoring. Hence, the term "controlling", and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or iPhone, a tablet, etc. . . . The device is thus not necessarily coupled to the lighting system but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
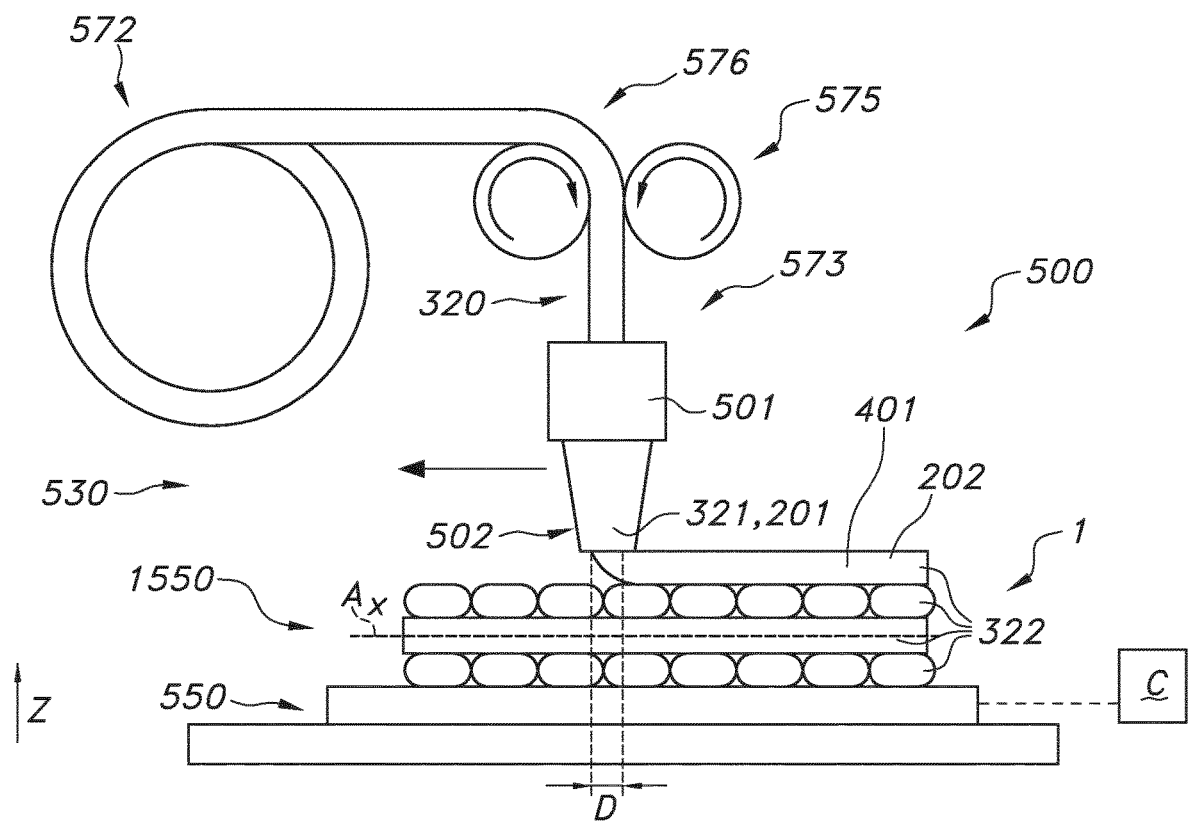
FIGS. 1a-1c schematically depict some general aspects of the 3D printer and of an embodiment of 3D printed material.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as an FDM 3D printer head is schematically depicted. Reference 501 indicates the printer head. The 3D printer of the present invention may especially include a plurality of printer heads (see below). Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below). Reference 321 indicates extrudate (of 3D printable material 201).

The 3D printer 500 is configured to generate a 3D item 1 by layer-wise depositing on a receiver item 550, which may in embodiments at least temporarily be cooled, a plurality of layers 322 wherein each layers 322 comprises 3D printable material 201, such as having a melting point $T_m$. The 3D printable material 201 may be deposited on a substrate 1550 (during the printing stage). By deposition, the 3D printable material 201 has become 3D printed material 202. 3D printable material 201 escaping from the nozzle 502 is also indicated as extrudate 321. Reference 401 indicates thermoplastic material.

The 3D printer 500 may be configured to heat the filament 320 material upstream of the printer nozzle 502. This may e.g. be done with a device comprising one or more of an extrusion and/or heating function. Such device is indicated with reference 573 and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire, which may be indicated as filament 320. The 3D printer 500 transforms this in an extrudate 321 downstream of the printer nozzle which becomes a layer 322 on the receiver item or on already deposited printed material. In general, the diameter of the extrudate 321 downstream of the nozzle 502 is reduced relative to the diameter of the filament 322 upstream of the printer head 501. Hence, the printer nozzle is sometimes (also) indicated as extruder nozzle. Arranging layer 322 by layer 322, a 3D item 1 may be formed. Reference 575 indicates the filament providing device, which here amongst others include the spool or roller and the driver wheels, indicated with reference 576.

Reference A indicates a longitudinal axis or filament axis.

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Alternatively or additionally, in embodiments the receiver plate may also be moveable in one or two directions in the x-y plane (horizontal plane). Further, alternatively or additionally, in embodiments the receiver plate may also be rotatable about z axis (vertical). Hence, the control system may move the receiver plate in one or more of the x-direction, y-direction, and z-direction.

Alternatively, the printer can have a head can also rotate during printing. Such a printer has an advantage that the printed material cannot rotate during printing.

Layers are indicated with reference 322, and have a layer height H and a layer width W.

Note that the 3D printable material is not necessarily provided as filament 320 to the printer head. Further, the filament 320 may also be produced in the 3D printer 500 from pieces of 3D printable material.

Reference D indicates the diameter of the nozzle (through which the 3D printable material 201 is forced).

Figure 1B:
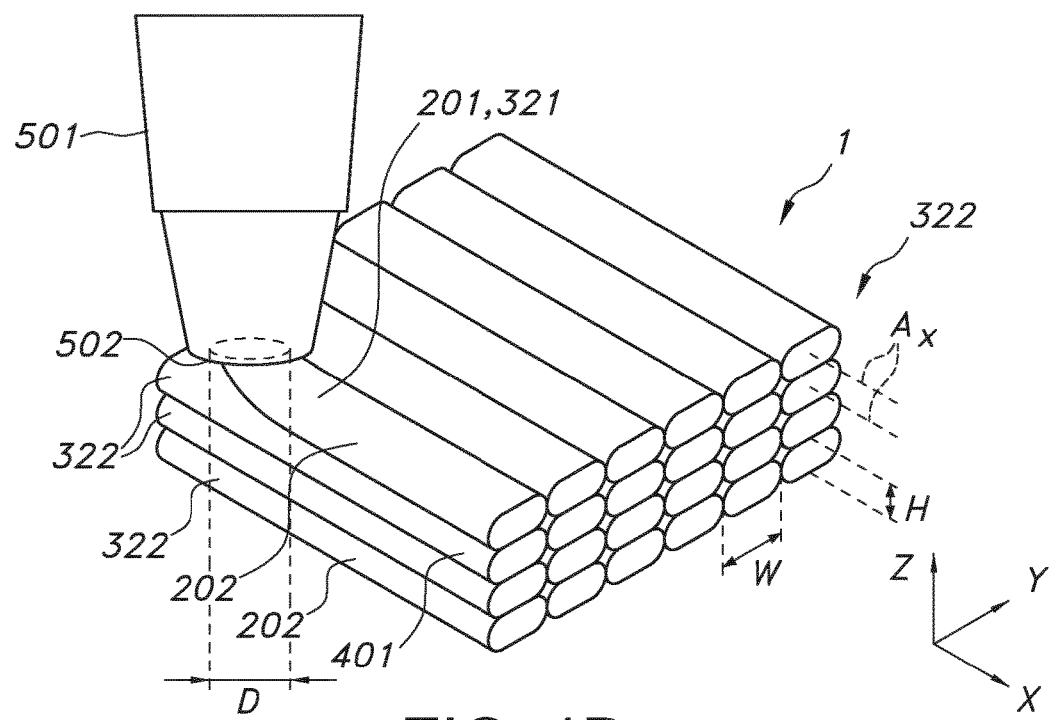

FIG. 1b schematically depicts in 3D in more detail the printing of the 3D item 1 under construction. Here, in this schematic drawing the ends of the filaments 321 in a single plane are not interconnected, though in reality this may in embodiments be the case. Reference H indicates the height of a layer. Layers are indicated with reference 322. Here, the layers have an essentially circular cross-section. Often, however, they may be flattened, such as having an outer shape resembling a flat oval tube or flat oval duct (i.e. a circular shaped bar having a diameter that is compressed to have a smaller height than width, wherein the sides (defining the width) are (still) rounded).

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 321 comprising 3D printable material 201 to the first printer head 501, and optionally (c) a receiver item 550. In FIGS. 1a-1b, the first or second printable material or the first or second printed material are indicated with the general indications printable material 201 and printed material 202, respectively. Directly downstream of the nozzle 502, the filament 321 with 3D printable material becomes, when deposited, layer 322 with 3D printed material 202.

Figure 1C:
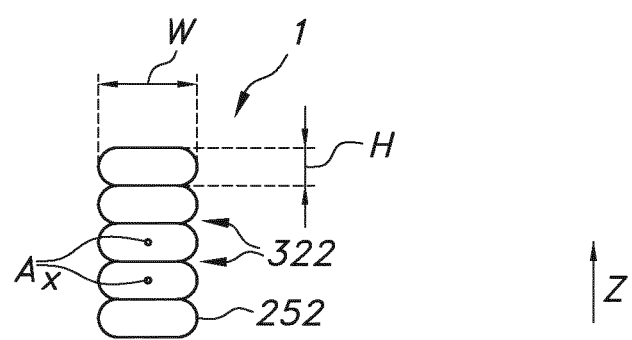

FIG. 1c schematically depicts a stack of 3D printed layers 322, each having a layer height H and a layer width W. Note that in embodiments the layer width and/or layer height may differ for two or more layers 322. Reference 252 in FIG. 1c indicates the item surface of the 3D item (schematically depicted in FIG. 1c).

Referring to FIGS. 1a-1c, the filament of 3D printable material that is deposited leads to a layer having a height H (and width W). Depositing layer 322 after layer 322, the 3D item 1 is generated. FIG. 1c very schematically depicts a single-walled 3D item 1.

Figure 2A:
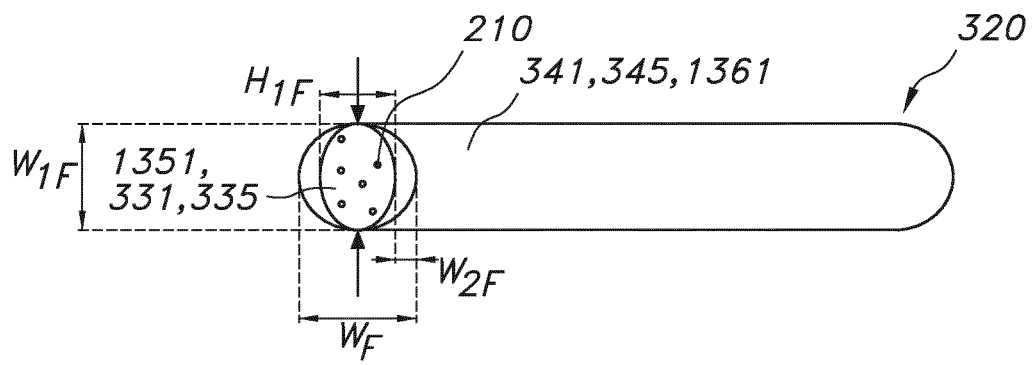
FIGS. 2a-2e schematically depicts some further aspects of the method of the invention.
Figure 2B:
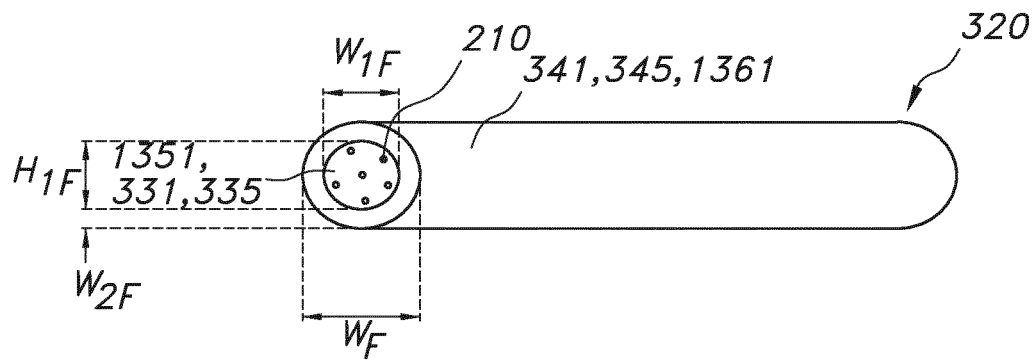

FIGS. 2a-2e schematically depicts some further aspects of the method of the invention. FIGS. 2a-2b depict some embodiments of a (core-shell) filament 320 that may be used in the method. The filaments 320 may be used in a printer 500, e.g. as depicted in FIG. 1a-1b, having a nozzle 502 with a single opening. The geometry, especially the width of the core W1F, height of the core H1F and the width (or thickness) of the shell W2F in the filaments are indicated. In the embodiment of FIG. 2b, the shell material 341 comprising shell polymeric material 345 completely enclosing the core material 331 (comprising core polymeric materials 335) (W2F is non-zero at all locations along the perimeter of the filament 320).

In embodiments depicted in FIG. 2a-b, the filament 320 comprises (i) core material 331 comprising a printable core material 1351, wherein the printable core material 1351 comprises a pore forming material 210; and (ii) a shell material 341 comprising a printable shell material 1361.

In the embodiment of FIG. 2a, the shell material 341 only partly encloses the core material 331. The shell material 341 does not enclose the core material 331 at the two locations indicated by the arrows; at these locations W2F is zero (0 μm). As such, the shell material 341 of the filament 320 covers (encloses) the core material 331 of the filament 320 at two continuous sections arranged at a surface of the filament 320, where W2F is non-zero.

Figure 2C:
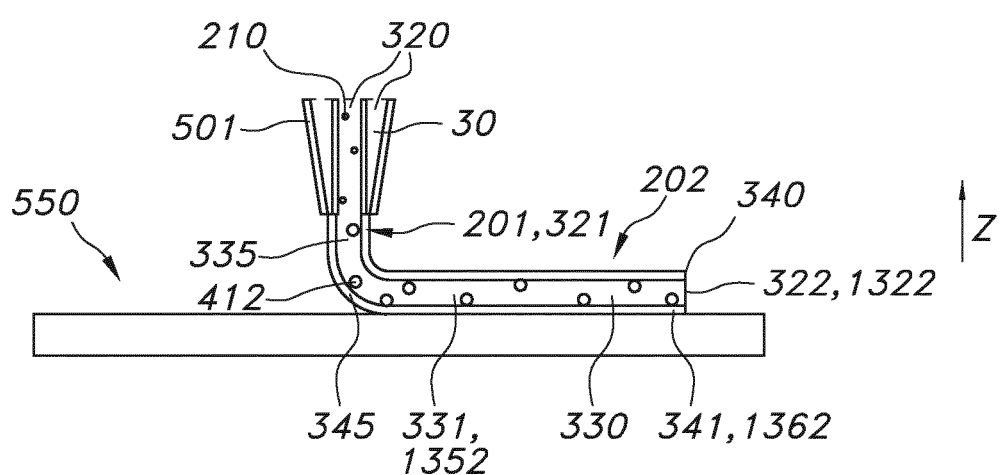
Figure 2D:
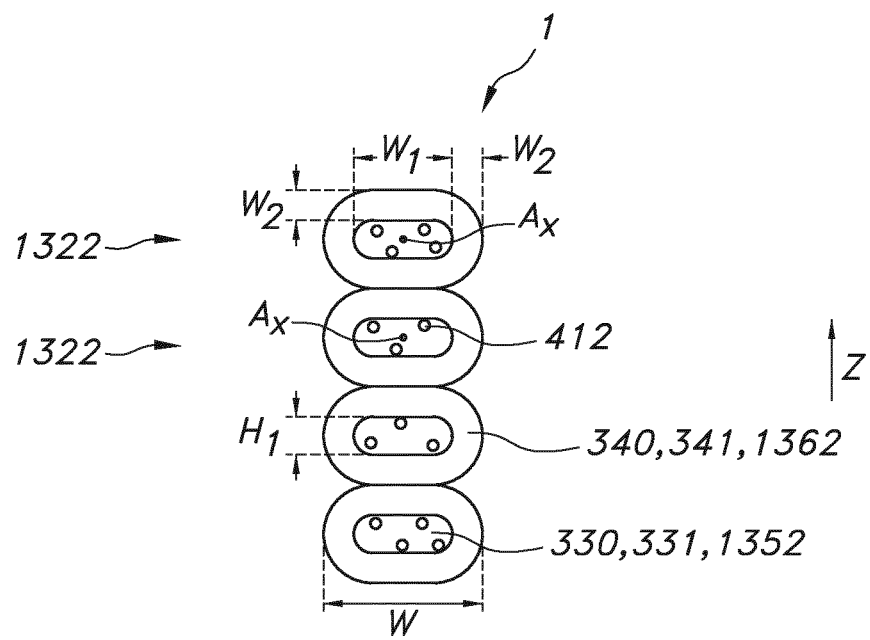

Using the filament 320 of FIG. 2b in the 3D printing stage may in embodiments result in the 3D item 1 depicted in FIG. 2d. Using the filament 320 of FIG. 2a in 3D printing stage may in embodiments result in the 3D item 1 depicted in FIG. 2e or in embodiments, to a stack of core-shell layers 1332 wherein W2 at some locations between two adjacent layers 1322 is zero and at other locations (between adjacent layers) is non-zero.

Additionally to or as an alternative to using core-shell filaments, a core-shell nozzle 502 may be used as is schematically illustrated in FIG. 2c. Filaments 320 comprising core printable material 1351 and shell printable material 1361 enter printing head 501 in the core nozzle (no reference) and shell nozzle 30, respectively. The core printable material 1351 may comprise pore forming material 210. During the pore forming stage, the pore forming material is heated and pores 412 may be formed. After extrusion, a core-shell layer 1322 is deposited comprising a core 330 comprising core material 331, comprising core printed material 1352; and a shell 340 comprising shell material 341, comprising shell printed material 1362.

Figure 2E:
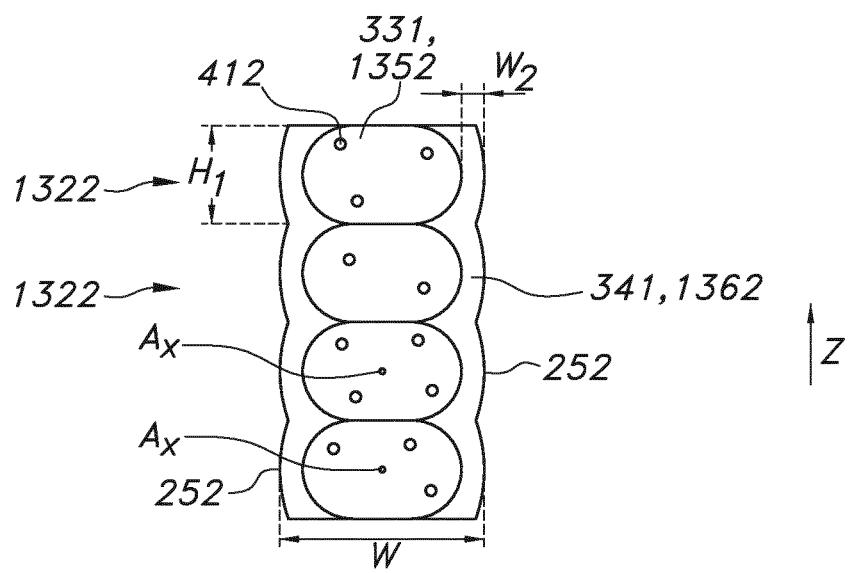

FIGS. 2d-2e schematically depict a stack of 3D printed core-shell layers 1322. The layers comprise core-shell layer 1322 of 3D printed material 202 and comprising a core 330 and a shell 340. The core 330 comprises a core material 331 comprising a first composition. The shell 340 comprises a shell material 341 comprising a second composition different from the first composition, e.g. in physical, chemical, and/or optical properties. In embodiments, the core printed material 1352 comprises pores 412. Further, the core height of the core 330 is indicated with reference H1, and the width of the core is indicated with reference W1. The shell 340 has a shell width W2. The shell width W2 may herein also be referred to as thickness W2 of the shell 340. FIG. 2d depicts an embodiment wherein (in each core-shell layer 1322) the shell 340 substantially complete encloses the core 330. In FIG. 2e, the shell 340 partly encloses the core 330 in each of the core-shell layers 1322.

Further, as shown in FIGS. 2d-2e, the width W1 of the core and the width W2 of the shell may be determined essentially perpendicular to the stacking height. Further, the height of the core H1 may be determined essentially parallel to the stacking height.

FIG. 2e further exemplifies an embodiment comprising a plurality of core-shell layers 1322 on top of each other wherein the shell widths W2 between two adjacent cores 330 is 0 μm, and wherein the shell width W2 at at least one of the sides of the cores 330 is non-zero. In the embodiments, the shell width W2 at both sides of the cores 330 is non-zero. Further, two surfaces 252 of the item 1 are schematically indicated.

FIGS. 2d-2e very schematically depict a 3D item 1 with an item wall (comprising two surfaces). FIG. 2e further depicts that both surfaces of the wall comprise the shell material 341 and no core material 331. In further embodiments, one of the surfaces or sections of surfaces of the wall comprise the shell material 341. In the former embodiment (with one surface comprising the shell material) especially the shell material 341 may be arranged only at one side of the core material 331. In FIG. 2e, the shell material 341 is arranged at two sides of core material 331.

FIGS. 2d-2e further illustrate the difference between embodiments wherein in the core-shell layer 1322, the shell material 341 completely encloses the core material 331 (FIG. 2d) and embodiments wherein in the 3D item 1, the shell material (almost) completely encloses the core material 331 (FIG. 2e).

Referring to FIGS. 2d-2e, the term "shell width" may especially refer to the largest shell width. The term "core height" may also especially refer to the largest core height. The term "core width" may also especially refer to the largest core width. Especially, the largest shell width is the width of the shell in the same plane as the largest core width.

In embodiments, the shell material 341 may cover the core material 331, especially to hide the core material 331 and/or or to protect the core material 331.

Figure 3:
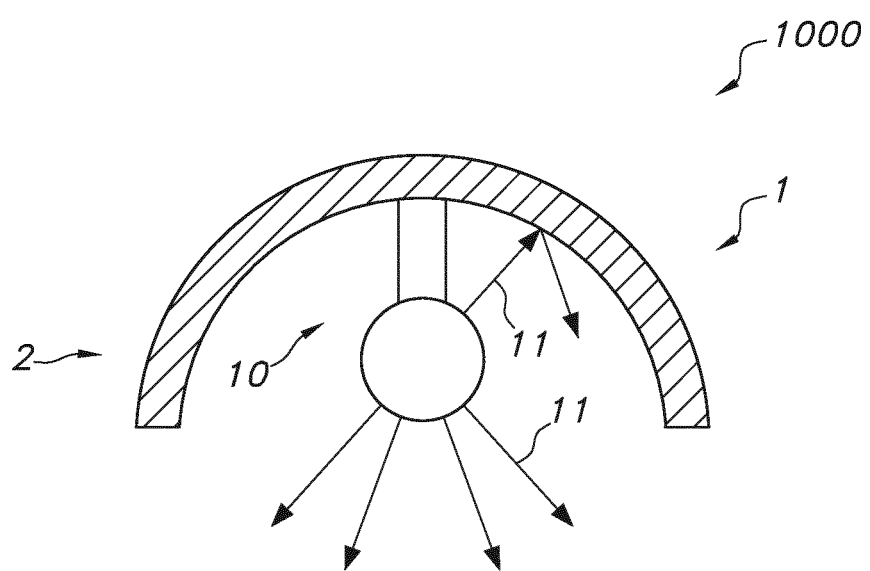
FIG. 3 schematically depicts an application.

FIG. 3 schematically depicts an embodiment of a lamp or luminaire, indicated with reference 2, which comprises a light source 10 for generating light 11. The lamp may comprise a housing or shade or another element, which may comprise or be the 3D printed item 1. Here, the half sphere (in cross-sectional view) schematically indicates a housing or shade. The lamp or luminaire may be or may comprise a lighting device 1000 (which comprises the light source 10). Hence, in specific embodiments the lighting device 1000 comprises the 3D item 1. The 3D item 1 may be configured as one or more of (i) at least part of a lighting device housing, (ii) at least part of a wall of a lighting chamber, and (iii) an optical element. Hence, the 3D item may in embodiments be reflective for light source light 11 and/or transmissive for light source light 11. Here, the 3D item may e.g. be a housing or shade.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A method for producing a 3D item by means of fused deposition modelling, the method comprising:
    a 3D printing stage comprising: layer-wise depositing 3D printable material, wherein the 3D printable material comprises 3D printable core material and 3D printable shell material, to provide the 3D item comprising a core-shell layer of 3D printed material, wherein the 3D printed material comprises a core comprising 3D printed core material and a shell comprising 3D printed shell material, wherein the shell at least partly encloses the core, wherein the 3D printable core material comprises a pore forming material with a first concentration $c_1$, wherein the 3D printable shell material comprises the pore forming material with a second concentration $c_2$, wherein $c_2>0$ and $c_2/c_1 \leq 0.9$; and
    a pore forming stage comprising: heating one or more of (i) the printable material and (ii) the 3D printed material.

2. The method according to claim 1, wherein $c_2/c_1 \leq 0.01$, and wherein $c_2 \leq 0.04$ wt %, and wherein $c_1 \geq 0.04$ wt %.

3. The method according to claim 1, wherein the shell of the core-shell layer of the 3D printed item has a shell width (W2), wherein the core-shell layer has a layer width (W); wherein $0.01 \leq W2/W < 0.3$, and wherein a first porosity $p_1$ of the core of the core-shell layer is in the range 5-40 vol. %.

4. The method according to claim 1, wherein the pore forming material has a boiling temperature, and wherein the method comprises 3D printing the 3D printable material with a nozzle temperature higher than the boiling temperature.

5. The method according to claim 1, selecting the pore forming material, the first concentration $c_1$, the second concentration $c_2$, and 3D printing conditions such that a density reduction of the core-shell layer of more than 10% is obtained, compared to the theoretical maximum density that is obtained when no pore forming material was incorporated in the 3D printable material.

6. The method according to claim 1, wherein the core and shell are the same thermoplastic material.

7. The method according to claim 1, wherein the pore forming material comprises water and wherein the pore forming stage comprises applying one or more of (i) microwave radiation and (ii) ultrasound.

8. The method according to claim 1, wherein the pore forming material in the core printable material and the pore forming material in the shell printable material are one of (i) the same pore forming material or the same pore forming materials at the same ratios, (ii) the same pore forming materials at different ratios, or (iii) different pore forming materials; wherein the pore forming material in the core printable material has a boiling point above room temperature.

* * * * *